United States Patent Office 3,098,450
Patented July 23, 1963

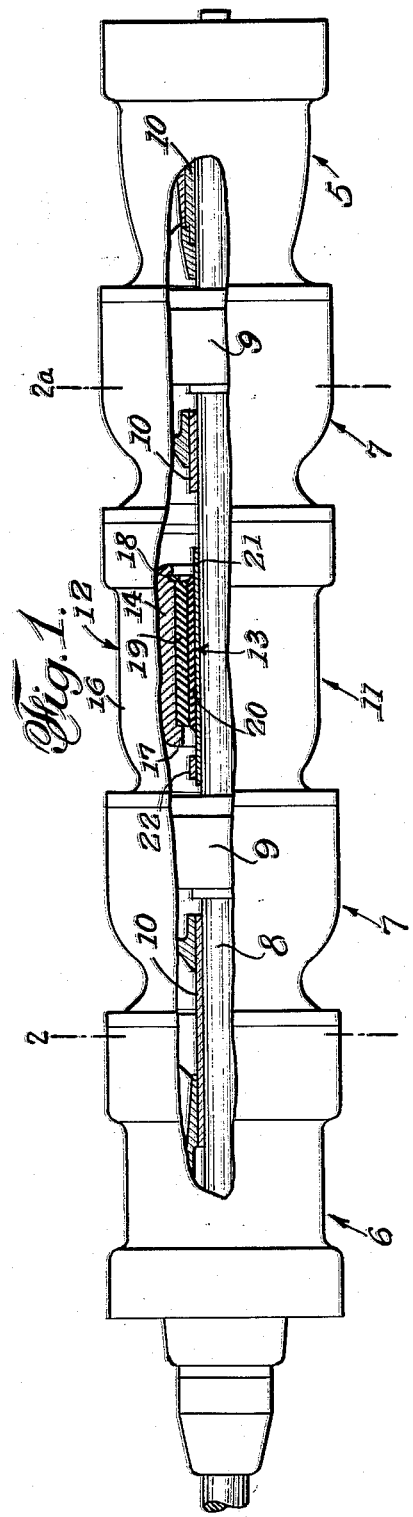
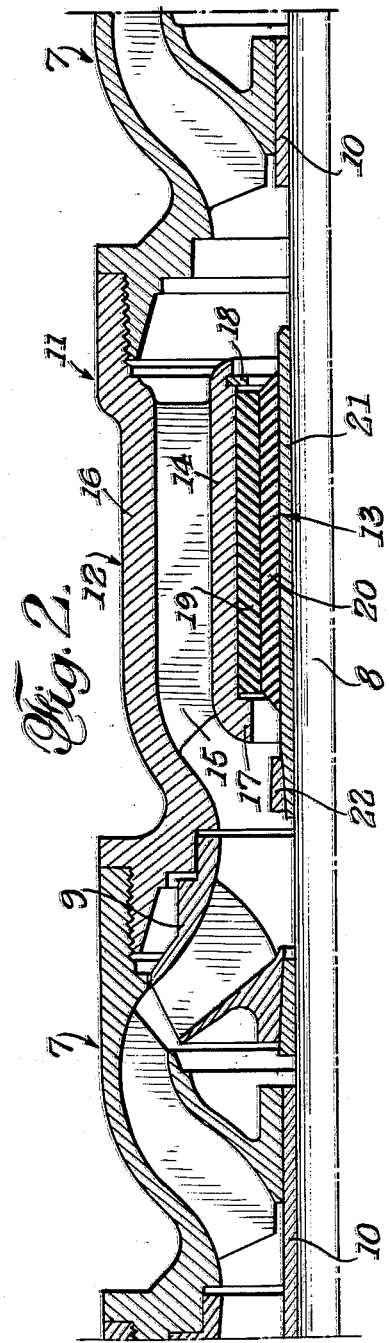
INVENTOR.
CLARK D. BOWER
BY C. C. Stratton
ATTORNEY

3,098,450
PUMP SHAFT BEARING MEANS
Clark D. Bower, Whittier, Calif., assignor to Layne & Bowler Pump Company, Los Angeles, Calif., a corporation of California
Filed July 26, 1961, Ser. No. 126,935
2 Claims. (Cl. 103—108)

This invention relates to bearing means for the shafts of pumps and like machines, particularly turbine pumps comprising a succession of bowls.

In machines of the above character, the shafts have bearing engagement in the several bowls, so as the properly operatively associate impellers, carried by the shaft, with the several bowls. The efficiency and longevity of the pump are largely dependt on the degree of wear in the shaft bearings. It will be clear that excessive wear will produce shaft play and such wobble therein that, at best, the impellers will become inefficient and, frequently, will become damaged as well as damaging the bowls in which they operate. The material moved by such pumps frequently contains foreign particles that are quite abrasive. The several bearings in the pump, usually metal or hard composition sleeves around the shaft, being substantially inelastic, are subjected to the friction of the grit and other foreign particles in the pump flow, and soon become so worn that malfunction of the pump ensues, as above indicated. This attrition affects the shaft also, and only replacement of the bearing sleeves, as well as the shaft, can restore the pump to efficient operation.

An object of the present invention is to provide means that not only minimizes such abrasive deterioration of the bearing sleeves and shaft, but also serves to minimize shaft wobble or deflection even in instances where appreciable wear has occured.

Another object of the invention is to provide, in combination with the usual bearings of a gang type of pump-machine having a series of bearings along the operation shaft thereof, and intermediate bearing that so accommodates grit and foreign particles that wear thereof is greatly reduced, the same, thereby, constituting shaft-supporting means that becomes increasingly effective to hold the shaft steady even when said usual bearings have become excessively worn.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a side elevational view, partly broken away, showing a turbine pump provided with pump shaft bearing means according to the present invention.

FIG. 2 is an enlarged quarter-sectional view of the portion of said pump between the lines 2 and 2a of FIG. 1.

The pump that is illustrated comprises, generally, an inlet unit 5, a discharge unit 6, and a plurality of bowl units 7 between the units 5 and 6 for pumping fluid from the inlet to and through the discharge, a high-speed shaft 8 extending longitudinally through the units 5, 6 and 7, an impeller 9 within each bowl unit 7 and carried by said shaft 8 and operatively associated with said latter units, and sleeve bearings or bushings 10 in the units 5, 6 and 7 to journal the shaft 8.

The above generally described pump is quite conventional and it will be clear that proper and efficient relationship between the impellers 9 and the interior portions of the bowls 7 is dependent on retention of a good bearing fit between shaft 8 and the several sleeves 10. In practice, sleeves or bushings 10 may be made of bronze, especially when the shaft 8 is made of steel, or of one of the oil-impregnated sintered bushings commonly used as bearing sleeves. In any case, the bushings 10, as well as the portions of the shaft 8 that rotate therein, being incapable of absorbing grit, are abraded by such grit in the flow induced by the impellers 9 and wear away, as belove explained.

According to the invention, the above-described pump is provided with an intermediate unit 11 that is preferably interposed between two bowl units 7 and has resilient support engagement with shaft 8.

Said intermediate unit 11 comprises, generally, a housing bowl 12, and a resilient bearing or journal 13 between said housing bowl 12 and the shaft 8.

The housing bowl 12 is formed with an inner fixed sleeve 14 connected by vanes 15 to the outer housing 16 of said bowl 12. The sleeve 14 is provided with a flange 17 at one end and with a retaining ring 18 at the other. Said sleeve 14 is concentric with the shaft 8.

The resilient bearing 13 comprises a resilient support bushing 19 preferably vulcanized or cemented to the interior face of the sleeve 14 and retained between flange 17 and retaining ring 18, a resilient bearing bushing 20 within the bushing 19, and a metal sleeve 21, fixedly held on shaft 8 by a sleeve collet 22. The bushing 20 is preferably vulcanized or cemented to the sleeve 21 and, therefore, is rotational with the shaft within the bore of support bushing 19.

The bushings 19 and 20 are preferably made of a resilient composition of which natural and synthetic rubber are examples. Soft or medium soft rubber is preferred, and the interfit of the bushings is such that they will rotate relatively and, while so doing, will cooperate with the bearing bushings 10 to hold the shaft 8 in proper operative position.

As in the case of the bushings 10, grit and other particles in the flow through the pump will impinge particularly against the inlet end of the bearing bushings 19 and 20, and seek ingress between said bushings. In such case, the grit will work its way between said bushings but, because the latter are soft, said grit will be accommodated between the bushings and in no wise alter the bearing engagement between the housing bowl 12 and the shaft 8. It will be clear that a relatively large amount of grit can be received between the bushings 19 and 20 before the same become so "loaded" with grit as to require replacement. In any case, while the grit is wearing the bushings 10, there is no appreciable change in the bearing efficiency of the bearing 13. As a consequence, the pump continues efficient operation due to retention of alignment of the shaft 8. Thus, the impellers 9 on said shaft retain their proper relationship to the bowls 7 until, after long use, the bearing 13 requires to be replaced. Since the danger of interference between the impellers and the inner portions of the bowls is obviated by the present means, repairs on the pump are kept to a minimum, frequently requiring only bearing bushing change.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. In a pump for moving therethrough abrasive-containing liquid, an elongated housing having an inlet and an outlet, an elongated operating shaft rotational in said housing, said housing having longitudinally arranged bowl units between the pump inlet and outlet, impellers carried by the shaft and operatively engaged with said bowl units to move liquid through said units from the inlet to the outlet of the pump, bearings mounting longitudinally spaced portions of the shaft in the bowl units, an intermediate resilient bearing disposed between and longitudinally spaced from the first-mentioned bearings to hold the shaft engaged and axially aligned with the housing, said bearings being disposed within the liquid flow through the pump and subject to attrition of abrasive in the flow, said resilient bearing comprising two rotationally engaged rubber bushings.

2. In a pump for moving therethrough abrasive-containing liquid, an elongated housing having an inlet and an outlet, an elongated operating shaft rotational in said housing, said housing having longitudinally arranged bowl units between the pump inlet and outlet, impellers carried by the shaft and operatively engaged with said bowl units to move liquid through said units from the inlet to the outlet of the pump, bearings mounting longitudinally spaced portions of the shaft in the bowl units, an intermediate resilient bearing disposed between and longitudinally spaced from the first-mentioned bearings to hold the shaft engaged and axially aligned with the housing, said bearings being disposed within the liquid flow through the pump and subject to attrition of abrasive in the flow, said resilient bearing comprising two rotationally engaged rubber bushings, the inner bushing being affixed to the shaft and the outer bushing being affixed to the housing.

References Cited in the file of this patent
UNITED STATES PATENTS

| | | |
|---|---|---|
| 1,510,804 | Sherwood | Oct. 7, 1924 |
| 2,166,404 | Hait | July 18, 1939 |
| 2,208,975 | Hait | July 23, 1940 |
| 2,517,608 | Taylor | Aug. 8, 1950 |